Figure 1:
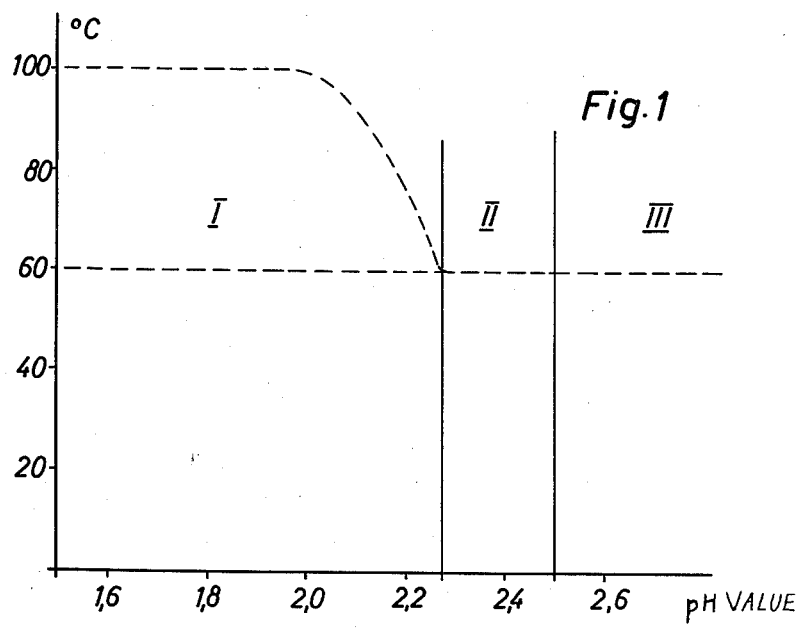

Sept. 25, 1962     F. JAFFE ET AL     3,055,844
FURFURYL ALCOHOL RESINS

Filed April 1, 1958     3 Sheets-Sheet 1

INVENTORS:
FRITZ JAFFÉ and HERBERT KAESMACHER
BY
Burgess, Dinklage & Sprung
ATTORNEYS

United States Patent Office 3,055,844
Patented Sept. 25, 1962

3,055,844
FURFURYL ALCOHOL RESINS
Fritz Jaffe, 31 Hultzstrasse, Koln-Braunsfeld, Germany, and Herbert Kaesmacher, 24 Kirchstrasse, Hehlrath, near Aachen, Germany
Filed Apr. 1, 1958, Ser. No. 725,639
Claims priority, application Germany Apr. 5, 1957
4 Claims. (Cl. 260—2)

This invention relates to improvements in or relating to furfuryl alcohol resins.

The formation of furfury alcohol resins by condensing furfuryl alcohol in the presence of acid catalysts is known. It is also known that a great amount of heat is evolved in this condensation, so that if there is insufficient removal of heat the condensation may finally proceed even in an explosive manner. Several suggestions have already been made for moderating the violence of the reaction. For example, the condensation may be carried out in the presence of water and the heat of the reaction evolved be absorbed in the form of heat of evaporation of the water. This process must be effected at about 100° C. because water is used as the solvent or diluting agent. It is also known to effect the condensation of furfuryl alcohol diluted with water at temperatures of not more than 30° C. in the presence of dilute hydrochloric acid without the supply of heat. For the reaction to be initiated and actually to proceed at these low temperatures, chlorohydrin or an aldehyde must be present. These additions cause the furfuryl alcohol to be activated with the formation of an intense green colour; by the addition of small proportions of lower aliphatic aldehydes to the green-coloured reaction solution, the reaction can be uniformly continued without subsequent cooling, and does not increase to more than 40° C.

A study was made of the interrelation between the course of the reaction and the properties of the furfuryl alcohol resin obtained by condensation of furfuryl alcohol. It appeared that the known furfuryl alcohol resins contain substantial proportions of difurylmethane and that, especially when high temperatures are used, the furfuryl alcohol resins formed contain no or only a few terminal alcohol groups. Moreover, the cured varnish coatings made with furfuryl alcohol resins of this kind have a resistance which decreases as the content of difuryl-methane in the furfuryl alcohol resin increases.

In the conversion of monomers into polymers by the process of the invention, a distinction must be made between two possibilities, viz. the building up of the molecule by condensation proceeding via the terminal OH groups and the polymerisation by splitting up of double bonds of the furane nucleus. While the condensation leads to molecules stretched in the form of chains, i.e. to products having resilient properties, the polymerisation via the unsaturated bonds leads to a very rigid and narrow cross-linked system which results in a brittle final product. It is obvious, therefore, that substantial admixtures of difuryl methane or of condensation products having no terminal OH groups are bound to result in a final product having unfavourable properties.

It has now been surprisingly found that it is possible to produce furfuryl alcohol resins which contain neither a detrimental proportion of difuryl methane nor a substantial proportion of products where are too highly condensed. More over, the furfuryl alcohol resins produced in accordance with the invention contain terminal alcohol groups. The condensation proceeds so that condensation products with a uniform and moderate chain length are obtained; these products have properties which are particularly useful technologically in the production of varnishes. In individual cases, condensation products with a moderate chain length may possibly have been observed in the case of known furfuryl alcohol resins, but even if the value found were to correspond to that of the new resins in accordance with the invention, this correspondence would be only apparent, for a uniform moderate chain length may also be simulated by the condensation product containing relatively large amounts of very short-chain constituents in addition to relatively large amounts of long-chain constituents. In contrast to this, in the case of the furfuryl alcohol resins prepared in accordance with the present invention it can be established by means of infra-red spectrographs that the products produced in accordance with the invention contain neither relatively large amounts of low-boiling constituents nor relatively large amounts of high-boiling constituents, but do actually consist of molecular chains of moderate chain length.

Figure 6:
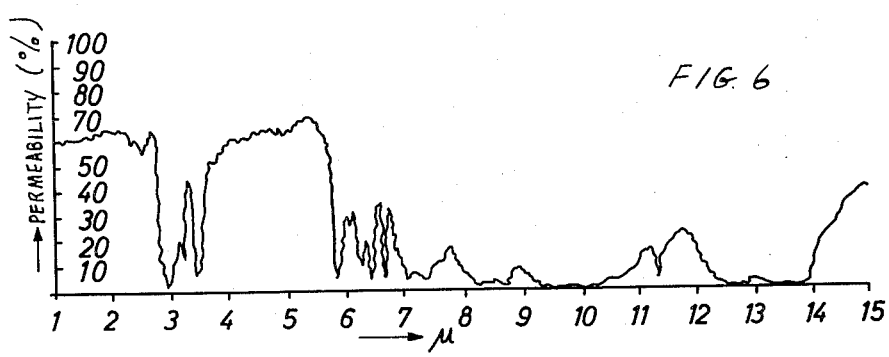

The invention provides, as new compounds, liquid furfuryl alcohol resins consisting essentially of molecules of the formula:

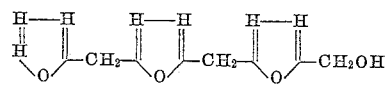

and having an average molecular weight of approximately 260 and an infra-red spectrum as shown in FIG. 6 of the accompanying drawings.

The condensation, in accordance with the invention, of furfuryl alcohol is effected at a temperature from 40° C. to 60° C., preferably 60° C., at a pH value in the aqueous phase from 2.0 to 2.5, preferably 2.4.

Figure 2:
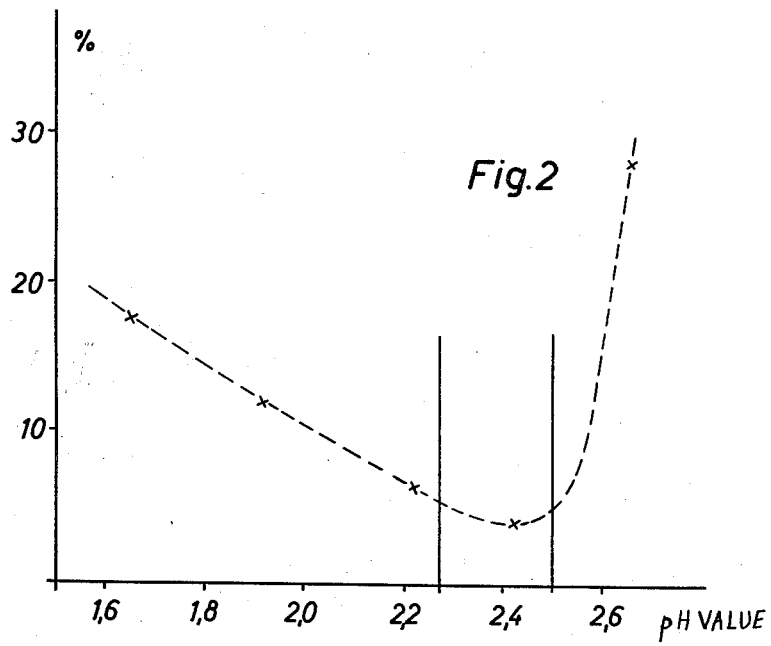

The accompanying drawings show the result of studies made on the variation of the temperature after heating to 60° C. as a function of the pH (FIG. 1) and on the proportion of difuryl methane in the condensed resin, likewise as a function of the pH (FIG. 2). As may be clearly seen from the drawings, an average reaction temperature of 60° C. can be maintained only within a relatively narrow pH range. When this pH range is used, the condensation product obtained contains a minimum proportion of difuryl methane.

Several examples out of a long series of tests made as a basis for the two diagrams shown in FIGS. 1 and 2 are given below.

In all mixtures of starting materials, the ratio of furfuryl alcohol to water was 1:1 and the pH values given refer only to the aqueous phase.

| Starting mixture | pH | Temperature variation after heating to 60° C | Difuryl methane in the finished resin |
|---|---|---|---|
| 5,000 gms. furfuryl alcohol. 5,000 gms. H₂O 10 gms. H₂SO₄ | 1.65 | Rapid increase in temperature to 100° C. some insoluble byproducts are formed | 17.5 |
| 5,000 gms. furfuryl alcohol. 5,000 gms. H₂O 4 gms. H₂SO₄ | 1.93 | as before | 12.1 |
| 5,000 gms. furfuryl alcohol. 5,000 gms. H₂O 2 gms. H₂SO₄ | 2.20 | Slow increase to 70–75° C. | 6.5 |
| 5,000 gms. furfuryl alcohol. 5,000 gms. H₂O 1.5 gms. H₂SO₄ | 2.43 | After initial heating, a temperature of 60° C. can be maintained without additional supply of heat. | 4.2 |
| 5,000 gms. furfuryl alcohol. 5,000 gms. H₂O 1 gm. H₂SO₄ | 2.65 | Slow decrease in temperature. The heat evolved in the reaction is unsufficient for maintaining the temperature at a constant level. | 28.0 |

If the condensation of furfuryl alcohol is effected by the process of the invention at a temperature range from 40° to 65° C., preferably 60° C., and at a pH of 2.0–2.5, heating to temperatures in excess of 60° C., namely up to about 80° C., is possible for some time after the end of the highly exothermic reaction without a detrimental effect on the reaction product. The end of the highly exothermic reaction is evidenced by the fact that the temperature begins to drop slowly while the pH is maintained at 2.0 to 2.5. From this moment, heat may be supplied without a detrimental effect and the product may be heated to temperatures in excess of 60° C.

Three examples are given below. Example 1 illustrates the process of the invention. Example 2 illustrates the situation when heat to give a temperature in excess of 60° C. is applied at the beginning of the condensation, and Example 3 illustrates the effect of the pH value on the condensation.

*Example 1*

A mixture is made of 2,500 grams of furfuryl alcohol and 1,500 grams of water. The mixture is vigorously agitated and thereafter 1 litre of an aqueous sulphuric acid (0.75 gm. $H_2SO_4$/litre) is added. The mixture is carefully heated to 60° C. with vigorous stirring. After this temperature has been reached, the supply of heat is discontinued and the heat of reaction evolved allows the condensation or polymerisation to continue with a small increase in temperature, but not beyond 65° C. After about 5 to 6 hours, the temperature begins to drop and then heat may be supplied for 3 hours. The temperature during this heating may be allowed to vary between 60 and 80° C. without the final product being greatly effected.

The resin obtained has a viscosity of 140 to 180 DIN seconds and is particularly resistant to chemicals due to its uniform molecular size and due to its low content of short-chain intermediate products. The viscosity of the resin does not increase to a marked degree even after a period of 3 months.

*Example 2*

A starting mixture as described in Example 1 is heated to 80° C. After about 30 minutes, a very rapid increase in temperature to 100° C. occurs while larger amounts of formaldehyde are evolved. The viscosity of the resin obtained is higher than 1000 DIN seconds after an operative time of as little as 3 hours. The percentage of short-chain compounds, especially of difuryl methane, is very high, viz. 14 to 20%. After about 8 to 14 days, substances condensed to a considerably higher degree separate out as gel particles at the bottom. The resistance to chemicals is relatively poor.

*Example 3*

1,000 grams of furfuryl alcohol and 1,000 grams of water are thoroughly mixed, whereupon 1000 cc. of catalyst solution (0.25 gm. $H_2SO_4$/litre) are admixed thereby bringing the pH to 2.85. The condensation is carried out under the same conditions as mentioned in Example 1. However, heat has to be supplied throughout the experiment in order to maintain the temperature at 60° C. The final product contains about 60% of difuryl methane in addition to furfuryl alcohol and higher condensed products.

Figure 3:
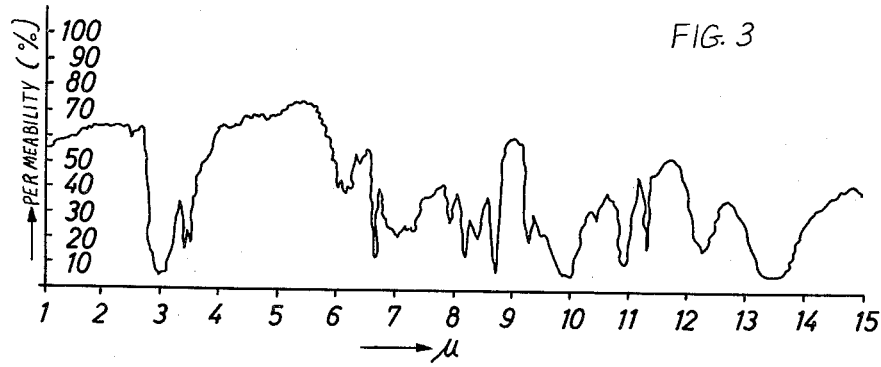

The following infra-red spectrographs are shown in FIGS. 3 to 7 of the accompanying drawings:

FIG. 3, infra-red spectrograph of furfuryl alcohol.

Figure 4:
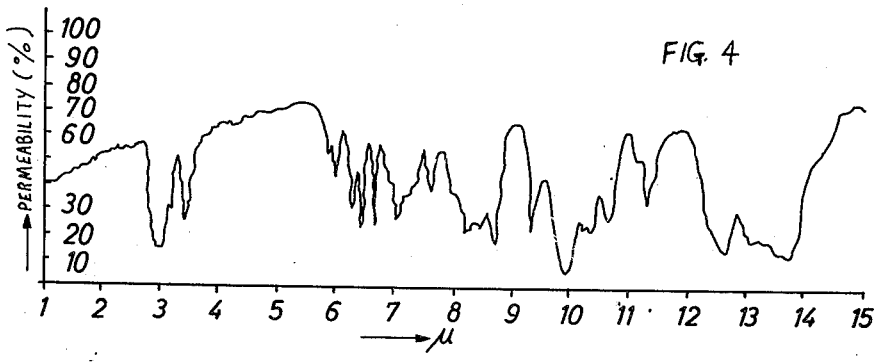

FIG. 4, infra-red spectrograph of the first condensation product obtained from furfuryl alcohol, i.e. 5-furfuryl-furfuryl alcohol

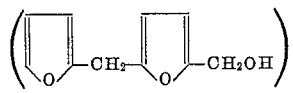

Figure 5:
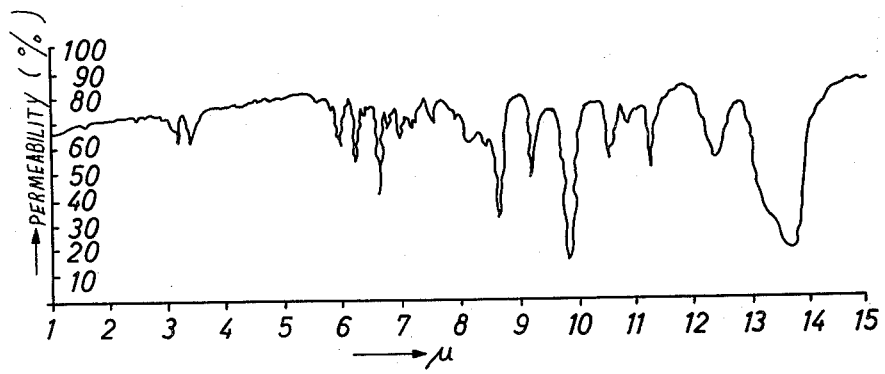

FIG. 5, infra-red spectrograph of difuryl methane, which is formed by splitting off of formaldehyde from 5-furfuryl-furfuryl alcohol

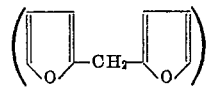

FIG. 6, infra-red spectrograph of a furfuryl alcohol resin produced in accordance with the invention.

Figure 7:
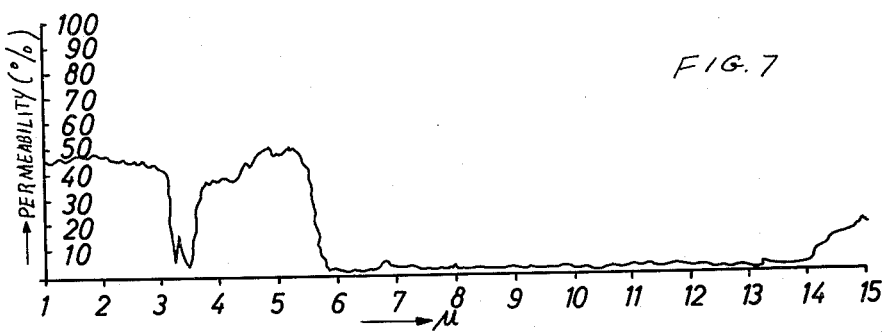

FIG. 7, infra-red spectrograph of the furfuryl alcohol resin corresponding to FIG. 6, but cured with an acid.

In FIG. 3 as well as in FIG. 4, an intense absorption band is clearly seen at 2.98μ. In FIG. 5, this absorption band is absent since the reactive methylol group has been lost by the splitting-off of formaldehyde. The resin used for the production of the infra-red spectrograph shown in FIG. 6 has previously been thoroughly freed from any small proportions of furfuryl alcohol, difuryl methane and 5-furfuryl-furfuryl alcohol contained therein, in order to avoid false conclusions in evaluation. The infra-red spectrograph shown in FIG. 6 indicates that in the resinification process of the invention the OH group was preserved, which ensures the full reactivity of the resin. In FIG. 7, the characteristic band of the OH group is absent after a solid and insoluble final product has formed by polymerisation and further condensation via the OH group with subsequent splitting-off of formaldehyde.

The resin in accordance with the invention and with an infra-red spectrograph as shown in FIG. 6 was also examined, to determine its molecular size, by the freezing point depression method. With a condensation period of 9 hours, a pH of 2.4 and a temperature of 60° C., the average molecular weight was about 260.

This value corresponds to a product which consists of three furane nuclei linked by methylene bridges and with one terminal methylol group. By solvent separation of the resin into individual fractions, only small portions of lower and higher condensed substances could be separated.

When the reaction conditions just mentioned were maintained but an extended reaction time used, a uniform increase in molecular weight was obtained as shown in the following table.

| Reaction time, hrs.: | Molecular weight of resin |
|---|---|
| 9 | 260 |
| 13 | 290 |
| 17 | 320 |
| 21 | 350 |
| 25 | 380 |
| 29 | 410 |
| 33 | 440 |

After 33 hours, the viscosity of the resin had increased to such an extent that continuation of the condensation would result in products which would no longer be usable in varnishes. The maximum value of the molecular weight reached after 33 hours corresponds to a resin having about five furane nuclei. A test of the resins corresponding to the values shown in the second column of the above table shows that in all cases the resins still contain the methylol group required for the final condensation. The practical result of the preceding statements is that resins having 3, 4 or 5 nuclei or the transition stages in mixed form can be obtained as desired by controlling the reaction time.

What we claim is:

1. In the process for the production of furfuryl alcohol resins in which furfuryl alcohol is condensed in the presence of an acid catalyst and water in an exothermic reaction, the improvement which comprises effecting the condensation at a pH between about 2.0 and 2.5 while maintaining the temperature between about 40 degrees C. and 65 degrees C. for at least the exothermic phase of the reaction.

2. Improvement according to claim 1 in which a pH is maintained at a value of about 2.4 and the temperature at about 60 degrees C.

3. Improvement according to claim 1 in which the temperature of the reaction is increased up to a temperature of about 80 degrees C. after the exothermic phase of the reaction.

4. Improvement according to claim 1 in which the condensation is effected for a period of time between about 9 and 33 hours.

References Cited in the file of this patent

UNITED STATES PATENTS

| | | |
|---|---|---|
| 1,665,235 | Trickey et al. | Apr. 10, 1928 |
| 2,323,334 | Kauth | July 6, 1943 |
| 2,681,896 | Nielsen | June 22, 1954 |

OTHER REFERENCES

Dunlap: "Ind. and Engineering Chem.," July 1942, page 815. (Copy in Division 60.)